(12) United States Patent
Koelblin et al.

(10) Patent No.: US 8,581,102 B2
(45) Date of Patent: Nov. 12, 2013

(54) CURABLE COMPOSITION FOR MEDIUM AND HIGH VOLTAGE POWER CABLES

(75) Inventors: Christian Koelblin, Meximieux (FR); Thomas Stuhldreier, Mönchengladbach (DE); Franz Daenekas, Garbsen (DE); Mark Hartley, Toronto (CA)

(73) Assignee: Nexans, Paris (FR)

( * ) Notice: Subject to any disclaimer, the term of this patent is extended or adjusted under 35 U.S.C. 154(b) by 688 days.

(21) Appl. No.: 12/625,091

(22) Filed: Nov. 24, 2009

(65) Prior Publication Data
US 2011/0067898 A1 Mar. 24, 2011

(30) Foreign Application Priority Data
Dec. 3, 2008 (FR) ..................... 08 58241

(51) Int. Cl.
*H01B 3/44* (2006.01)

(52) U.S. Cl.
USPC .................. 174/110 PM; 174/110 R; 524/95; 524/109

(58) Field of Classification Search
USPC ........................................ 174/110
See application file for complete search history.

(56) References Cited

U.S. PATENT DOCUMENTS

| | | | |
|---|---|---|---|
| 2,307,588 A * | 1/1943 | Jackson et al. | 428/379 |
| 3,822,147 A * | 7/1974 | Koerner et al. | 28/383 |
| 3,842,192 A * | 10/1974 | Hilker et al. | 174/120 SR |
| 4,299,713 A * | 11/1981 | Maringer et al. | 174/110 SR |
| 4,370,517 A * | 1/1983 | Soma et al. | 174/74 R |
| 4,400,429 A * | 8/1983 | Barlow et al. | 428/379 |
| 4,483,954 A * | 11/1984 | Braus et al. | 524/261 |
| 4,492,647 A * | 1/1985 | Braus | 252/573 |
| 4,499,013 A * | 2/1985 | Barlow et al. | 252/567 |
| 4,501,688 A * | 2/1985 | Braus | 252/573 |
| 4,512,920 A * | 4/1985 | Braus et al. | 252/573 |
| 4,514,535 A * | 4/1985 | Braus et al. | 524/109 |
| 4,514,536 A * | 4/1985 | Braus et al. | 524/261 |
| 4,536,530 A * | 8/1985 | Barlow et al. | 524/109 |
| 4,543,381 A * | 9/1985 | Barlow et al. | 524/188 |
| 4,548,865 A * | 10/1985 | Braus et al. | 428/379 |
| 4,596,603 A * | 6/1986 | Pellegrin et al. | 134/12 |
| 5,559,175 A * | 9/1996 | Kroggel et al. | 524/297 |
| 6,127,481 A * | 10/2000 | Janssen et al. | 525/106 |
| 7,674,854 B2 * | 3/2010 | Tada et al. | 525/61 |
| 2007/0244266 A1* | 10/2007 | Lumpp | 525/385 |
| 2007/0293651 A1* | 12/2007 | Tada et al. | 528/232 |

FOREIGN PATENT DOCUMENTS

DE 4437161 A1 * 4/1996
EP 223180 A1 * 5/1987

OTHER PUBLICATIONS

Barite, James P. Searls, 1997.*

* cited by examiner

*Primary Examiner* — James J Seidleck
*Assistant Examiner* — Peter A Salamon
(74) *Attorney, Agent, or Firm* — Sofer & Haroun, LLP

(57) ABSTRACT

An electric cable, has an electrical conductor surrounded by a cured electrically-insulating layer obtained from a curable composition with a polymer matrix, the polymer matrix having one or more polyolefins and a polyvinyl acetal as agent for reducing the formation of water treeing, the quantity of PVA being no more than 10% by weight in the composition.

16 Claims, 1 Drawing Sheet

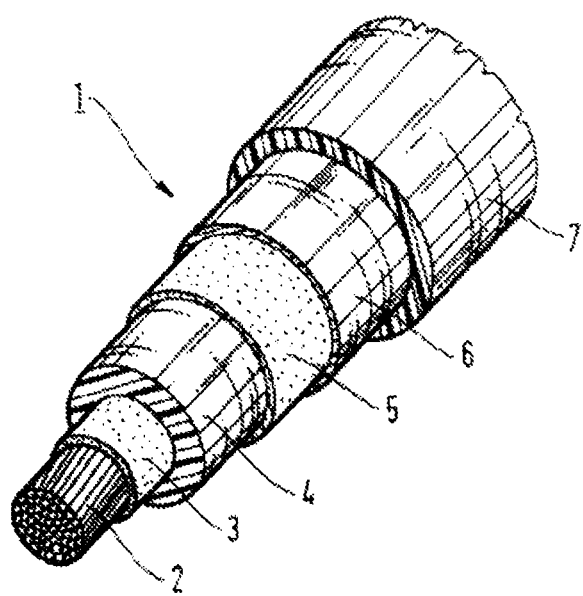

CURABLE COMPOSITION FOR MEDIUM AND HIGH VOLTAGE POWER CABLES

RELATED APPLICATION

This application claims priority to French Patent Application No. 08 58241, filed on Dec. 3, 2008, the entirety of which is incorporated by reference.

BACKGROUND

1. Field of the Invention

The present invention relates to a curable composition for use as an electrically-insulating layer for an electric cable, such that the electric cable presents improved ability to withstand aging in moist conditions and when powered.

The invention applies typically, but not exclusively, to the field of medium voltage power cables, in particular for voltages in the range 6 kilovolts (kV) to 60 kV, and to high voltage power cables, in particular at voltages greater than 60 kV, whether used with direct current (DC) or alternating current (AC).

2. Description of Related Art

Medium and high voltage power cables can come into contact with surrounding moisture during their lifetime. The presence of moisture in combination with the presence of an electric field and a polymeric material encourages progressive degradation of the insulating properties of the cable.

This degradation mechanism, known as "water treeing growth" can lead to breakdown of the cable in question and constitutes a considerable threat for the reliability of the power transport network, with the well-known economic consequences caused by electricity failures.

Document EP 0 223 180 describes a composition for use as an electrically-insulating layer in an electric cable for the purpose of limiting water treeing. That composition comprises a copolymer of an oligomer that is used as an agent for reducing water treeing, such as an/oligomer based on an ethylene and an alpha-unsaturated ester, together with a polymeric material that may be a polyethylene, but that could also be a polyvinyl acetal. The quantity of polymeric material, in particular of low density polyethylene, that is used in the examples is at least 95% by weight in the composition, with the remainder of the composition being constituted by the oligomer.

Nevertheless, although that composition does indeed reduce water treeing, it is far from being optimized for the purpose of significantly limiting the degradation associated with water treeing.

OBJECT AND SUMMARY OF THE INVENTION

The object of the present invention is to mitigate those drawbacks of the prior art technique by proposing a novel composition for use in particular as an electrically-insulating layer of an electric cable, presenting resistance to aging in a moist environment in the presence of an electric field, which resistance to aging is improved in significant manner.

The present provides an electric cable, comprising an electrical conductor surrounded by a cured electrically-insulating layer obtained from a curable composition comprising a polymer matrix, the polymer matrix comprising one or more polyolefins and a polyvinyl acetal, referred to below as "PVA", as agent for reducing the formation of water treeing, the quantity of PVA being no more than 10% by weight in the composition, preferably no more than 5% by weight in the composition, and more preferably no more than 3% by weight in the composition, and even more preferably no more than 1% by weight in the composition.

It has been discovered, surprisingly, that using a quantity of not more than 10% of weight of PVA enables water treeing to be significantly limited. A quantity of more than 10% by weight of PVA becomes harmful to another essential property, namely the loss angle known as tan delta, which is known to the person skilled in the art and which tends to increase significantly because of the presence of too great a quantity of PVA since it is a polar polymer.

In addition, a quantity of less than 10% by weight advantageously leads to a cost price that is relatively low for said composition. Finally, the preparation and the processing of the composition of the invention, in particular by extrusion, are made easier by the chemical nature of PVA.

PVA is a polymer having hydroxyl (or vinyl alcohol) groups, acetal (or vinyl acetal) groups, and possibly acetate (or vinyl acetate) groups. It is conventionally prepared from aldehydes and polymers of polyvinyl alcohol.

The structure of a PVA can be represented by the following general formula (I):

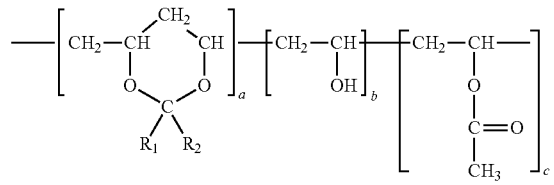

in which $R_1$ and $R_2$ are identical or different, and may be selected from hydrogen and $C_1$-$C_{10}$ alkyl groups such as for example methyl, ethyl, or butyl groups.

Formula I may comprise:
- 75% to 95% by weight of vinyl acetal groups (a);
- 6% to 30% by weight of vinyl alcohol groups (b); and
- 0 to 13% by weight of vinyl acetate groups (c).

Preferably, the PVA is a terpolymer of polyvinyl acetal, i.e. the PVA comprises all three groups a, b, and c.

More particularly, the PVA of the invention has a glass transition temperature Tg lying in the range 50° C. to 100° C., the glass transition temperature being measured in conventional manner by differential scanning calorimetry (DSC) in application of ISO standard 11357.

According to another characteristic, the PVA has a molecular mass lying in the range 20,000 grams per mole (g/mol) to 600,000 g/mol, and preferably in the range 30,000 g/mol to 400,000 g/mol.

According to another characteristic, the hydroxyl group content of the PVA lies in the range 7% to 30% by weight relative to the polyvinyl alcohol polymer, preferably 12% to 20% by weight relative to polyvinyl alcohol polymer.

Preferably, the softening point temperature Tr of the PVA is at least 70° C., preferably at least 80° C., and more preferably at least 90° C., the softening point Tr being measured in conventional manner by the bead-and-ring method in application of the DIN EN 1427 standard.

According to another characteristic, the free chloride ion content in the PVA is at most 100 parts per million (ppm) so as to obtain high purity PVA, with chloride ion content being measured in conventional manner using ISO standard 6227.

In a particularly advantageous embodiment, the PVA may be selected from polyvinyl butyral, referred to below as "PVB", and a polyvinyl formal, referred to below as "PVF".

According to above-described formula I, $R_1$=H and $R_2$=$C_3H_7$ for PVB, and $R_1$=H and $R_2$=H for PVF.

The polyolefin(s) of the invention may be at least one polymer of ethylene, preferably a homopolymer of ethylene.

In a particular embodiment, the ethylene polymer is a low density homopolyethylene, or in other words an ethylene homopolymer of density lying in the range 0.900 grams per cubic centimeter (g/cm$^3$) to 0.930 g/cm$^3$.

According to a particular characteristic, the polymer matrix has a melt flow index (MFI) lying in the range 0.8 grams per 10 minutes at 190° C. to 3 grams per 10 minutes at 190° C., and preferably at most 2 grams per 10 minutes at 190° C. The melt flow index in the present invention is typically determined using the ASTM D1238 standard.

By way of example, the MFI of the polymer matrix may be achieved by mixing the PVA with an ethylene polymer having an MFI of 0.8 to 3 grams per 10 minutes at 190° C. It is also possible to mix the PVA with two ethylene polymers having respective MFIs of 0.3 to 0.8 grams per 10 minutes at 190° C. and 2 to 3 grams per 10 minutes at 190° C.

Preferably, the MFI of the polymer matrix for a composition that is to be used in fabricating an electrically-insulating layer of a medium voltage cable is about 2 grams per 10 minutes at 190° C., and the MFI of the polymer matrix for a composition for use in fabricating an electrically-insulating layer for a high voltage cable lies in the range approximately 0.8 to 1 grams per 10 minutes at 190° C.

In a particularly advantageous embodiment, the polymer matrix is constituted by one or more polyolefins and PVA, or in other words, said matrix comprises solely one or more polyolefins and PVA.

The composition of the invention may include at least 50% by weight of polyolefins, preferably at least 60% by weight of polyolefins, more preferably at least 70% by weight of polyolefins, still more preferably at least 80% by weight of polyolefins, and most preferably at least 90% by weight of polyolefins.

According to another characteristic of the composition, it may include at least 99.9% by weight of polyolefins.

The composition of the invention is suitable for being extruded by techniques that are well known to the person skilled in the art and it may also include a stabilizing agent such as an antioxidant, in order to limit degradation of the polymer matrix while it is being prepared, e.g. in an extruder.

The composition of the invention is curable. The composition may be cured using conventional curing techniques well known to the person skilled in the art, such as for example: peroxide curing and/or hydrosilylation under the action of heat; silane curing in the presence of a curing agent; curing by means of electron, gamma ray, X-ray, or microwave beams; photochemical curing such as irradiation with beta rays, or irradiation with ultraviolet rays in the presence of a photo-curing initiator.

In the context of the invention, peroxide curing under the action of heat is preferred. In this particular circumstance, the composition may also include a curing agent such as an organic peroxide.

Because the curable composition is cured in order to obtain the cured electrically-insulating layer, the electric cable of the invention retains constant dimensional stability in its operational configuration, even when its operating temperature is high, i.e. greater than 70° C., or even about 90° C. The cured polymeric lattice of said electrically-insulating layer thus withstands water treeing very well.

In particularly preferred embodiment, the electric cable of the invention further comprises a cured semiconductive layer (first layer) between the electric conductor and the cured electrically-insulating layer (4) (second layer), and another cured semiconductive layer (5) (third layer) surrounding the cured electrically-insulating layer (4). The first, second, and third cured layers thus surround the electrical conductor in succession.

The term "semiconductive" as used in the present invention should also be understood as including "conductive".

The invention also provides a method of fabricating an electric cable as described above and comprising three successive layers. The method comprises the steps consisting in:

i) extruding and depositing the semiconductive first layer around the electrical conductor;

ii) extruding and depositing the electrically-insulating second layer around said first layer;

iii) extruding and depositing the semiconductive third layer around said second layer; and iv) curing the first, second, and third layers.

In a variant, steps i) to iii) may be performed simultaneously, with step iv) being performed after the coextrusion and codeposition of the first, second, and third layers.

In another variant, step iv) may be performed after each of steps i), ii), and iii).

BRIEF DESCRIPTION OF THE DRAWING

Other characteristics and advantages of the present invention appear in the light of the description of a non-limiting example of an electric cable of the invention given with reference to FIG. 1 which is a diagrammatic perspective and section view of an electric cable in a preferred embodiment of the invention.

For reasons of clarity, only essential elements for understanding the invention are shown diagrammatically, and scale is not complied with.

MORE DETAILED DESCRIPTION

The medium or high voltage power cable 1 for alternating current, as shown in FIG. 1, comprises a central conductor element 2, in particular made of copper or aluminum, and in succession and coaxially around said element: an "inner" semiconductive layer 3; an electrically-insulating layer 4 obtained using a composition of the invention; an "outer" semiconductive layer 5; a grounding and/or protective metal shield 6; and an outer protective sheath 7.

The layers 3, 4, and 5 are layers that have been extruded and cured by methods that are well known to the person skilled in the art.

The presence of the semiconductive layers 3 and 5, of the metal protective shield 6, and of the outer protective sheath 7 is preferred but not essential. The protective structure comprising the metal shield 6 and the outer protective sheath 7 could also include other protective elements such as, in particular: a protective strip (not shown) that swells in the presence of water and that is semiconductive, which strip is preferably interposed between the outer semiconductive layer and the protective metal shield, or metal armoring made of steel wires that are preferably positioned around the outer protective sheath 7. The protective structure of the cable is itself of known type and lies outside the ambit of the present invention.

EXAMPLES

Fabricating an Electric Cable Including Three-Layer Insulation

Initially, compositions (compositions A to C) were prepared having ingredients as set out in Table 1 below, said ingredients being expressed as percentages (%) by weight of the composition.

TABLE 1

|  |  | Composition | | |
|---|---|---|---|---|
|  |  | A | B | C |
| Polyethylene (PE) (% by weight) | | 96.8 | 78.8 | 97.8 |
| Agent reducing the formation of water treeing | PVB 1 (% by weight) | 1 | / | / |
|  | EBA (% by weight) | / | 19 | / |
| Antioxidant (% by weight) | | 0.2 | 0.2 | 0.2 |
| Peroxide (% by weight) | | 2 | 2 | 2 |

The various ingredients of the compositions in Table 1 have the following origins:
- the PE is a homopolymer of low density ethylene that is of high purity, sold by the supplier Sabic Europe under the reference LDPE 2102TX00;
- the EBA is a copolymer of ethylene and butyl acrylate sold by the supplier Arkema under the reference Lotryl® 17BA07;
- the PVB1 is a polyvinyl butyral in the form of a powder having a glass transition temperature Tg of 84° C., a vinyl alcohol content of about 16%, and a molecular mass of about 40,000, sold by the supplier Wacker Polymer Systems GmbH under the reference Pioloform® BL16;
- the antioxidant is a 4,6-bis(octylthiomethyl)-o-cresol (liquid) sold by the supplier Ciba Specialty Chemicals under the reference Irgastab® KV 10; and
- the peroxide is tert-butylcumylperoxide (liquid) sold by the supplier Arkema under the reference Luperox® 801.

All of the ingredients of each of the compositions A to C were mixed respectively in a conventional single-screw extruder of the 38-25D type provided with a "Maillefer" screw at a temperature lying in the range 110° C. to 130° C. so as to obtain a polymer matrix in the molten state while avoiding initiating premature curing of the composition.

Each of said compositions was then extruded and deposited around a conductive copper cord that had previously been covered in a first semiconductive layer obtained from an extruded mixture sold by the supplier Borealis under the reference LE0592.

Thereafter, a second semiconductive layer identical to the first semiconductive layer was extruded and deposited around each previously-formed two-layer structure.

Finally, the three layers formed in that way were cured under the action of heat at a temperature higher than the decomposition temperature of the organic peroxide contained in each of the three layers.

This produced three electric cables A to C each having three extruded and cured layers, with the electrically-insulating layer, as sandwiched between the two semiconductive layers, being obtained from the compositions A to C respectively.

Aging and Breakdown Voltage Test

In order to determine the properties of the electric cables A to C, in terms of resistance to water treeing, use was made of the method described in the document "Model cable test for evaluating the aging behavior under water influence of compounds for medium voltage cables", by H. G. Land and Hans Schädlich, pp. 177-182, published during the "Conference Proceedings of Jicable 91", of Jun. 24-28, 1991, at Versailles, France.

That method consists firstly in aging the electric cables A to C, while under an AC voltage, in a trough of water at 70° C. for 1000 hours. A breakdown test was then performed by subjecting the cables to an AC voltage at a frequency of 50 hertz (Hz) in order to determine their breakdown voltages after aging. The breakdown voltage of a cable corresponds to the voltage necessary for forming an electric arc within the cable. It is typically expressed relative to the maximum electric field at the interface between the inner semiconductive layer and the electrically-insulating layer of the three-layer electric cable.

The results of the breakdown voltage tests are summarized in Table 2 below.

TABLE 2

|  | Electric cable | | |
|---|---|---|---|
|  | A | B | C |
| Initial value [kV/mm] | 105 | 103 | 95 |
| After 1000 h [kV/mm] | 54 | 55 | 40 |

The breakdown voltage of electric cables of the present invention (cable A) is relatively high compared with cable C. Consequently, the electrically-insulating composition of the invention presents better aging and improved resistance to water treeing.

In addition, it can be seen that the quantity of agent that reduces the formation of water treeing (PVB1) in composition A is nearly 20 times smaller than the quantity of agent that reduces the formation of water treeing (EBA) in composition B. Composition A of the invention is thus very inexpensive.

Stripability Test

The stripability test serves to determine the initiating force in newtons (N) needed to separate two layers that are bonded together.

This "separation initiating" force was measured on respective two-layer test pieces each in the form of a rectangular block having a width of 10 millimeters (mm), an effective length of 40 mm, and a thickness of about 2 mm, i.e. about 1 mm of thickness for each layer. Each two-layer block comprised an electrically-insulating layer and a semiconductive layer. Such blocks were obtained by compression molding each of the two layers at 125° C., followed by curing at 180° C. for 30 minutes with the two layers positioned one on the other.

Once the two-layer blocks had been formed, each of the two layers at one end of the two-layer block was placed in the respective jaws of a traction machine, with the traction rate being set at 50 millimeters per minute (50 mm/min).

In order to compare the results of the stripability test measurements, three two-layer blocks were prepared using the preparation method described below.

A first two-layer block G1 was prepared from composition A for the first layer and a composition sold by the supplier Dow Chemicals under the reference HFDA-0792 BK for the other layer.

A second two-layer block G2 was prepared from composition B for the first layer and the composition reference HFDA-0792 BK for the other layer.

A third two-layer block G3 was prepared from the composition C for the first layer and from the composition referenced HFDA-0792 BK for the other layer.

The results obtained are summarized in Table 3 below.

TABLE 3

|  | Two-layer block | | |
| --- | --- | --- | --- |
|  | G1 | G2 | G3 |
| Stripping initiation force (N) | 15.8 | One of the G2 broke before measurement | 23.4 |

The stripability test shows that it is easier to separate the layers of the two-layer block G1 than the layers of the two-layer block G3 since the initiation force for G1 is smaller than that for G3. Consequently, operations for connecting electric cables including the two layers G1 are made easier.

Furthermore, for given breakdown voltage after 1000 hours of aging, an electric cable comprising the two layers G1 not only presents an economic advantage stemming from the layer obtained from composition A, but also presents the advantage of being strippable, unlike the electric cable having the two layers G2.

What is claimed is:

1. An electric cable, comprising: an electrical conductor surrounded by a cured electrically-insulating layer obtained from a curable composition with a polymer matrix, the polymer matrix having one or more polyolefins as first component and a polyvinyl acetal (PVA) as a separate second component, said (PVA) being an agent for reducing the formation of water treeing, the quantity of PVA is no more than 10% by weight in the composition.

2. A cable according to claim 1, wherein the PVA has a glass transition temperature Tg lying in the range 50° C. to 100° C.

3. A cable according to claim 1, wherein the PVA has a molecular mass lying in the range 30,000 g/mol to 600,000 g/mol.

4. A cable according to claim 1, wherein the softening point temperature Tr of the PVA is at least 70° C.

5. A cable according to claim 1, wherein the free chloride ion content in the PVA is at most 100 ppm.

6. A cable according to claim 1, wherein the PVA is selected from a polyvinyl butyral and a polyvinyl formal.

7. A cable according to claim 1, wherein the polyolefin(s) is/are at least one polymer of ethylene, preferably a homopolymer of ethylene.

8. A cable according to claim 1, wherein the polymer of ethylene is a low density homopolymer of ethylene.

9. A cable according to claim 1, wherein the polymer matrix has a melt flow index of 0.8 to 3 grams per 10 minutes at 190° C.

10. A cable according to claim 1, wherein the polymer matrix is constituted of said polyolefins and of PVA.

11. A cable according to claim 1, wherein the cured electrically-insulating layer comprises at least 50% by weight of polyolefins.

12. A cable according to claim 1, further including a stabilizing agent.

13. A cable according to claim 1, further including a cured semiconductive layer between the electrical conductor and the cured electrically-insulating layer, and another cured semiconductive layer surrounding the cured electrically-insulating layer.

14. A cable according to claim 1, wherein the PVA is a polymer having hydroxyl groups, acetal groups, and optionally acetate groups.

15. A cable according to claim 14, wherein the PVA is represented by the following general formula I:

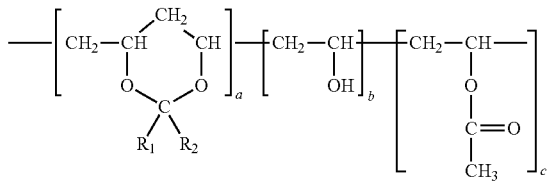

in which $R_1$ and $R_2$ are identical or different, and are selected from hydrogen and $C_1$-$C_{10}$ alkyl groups.

16. A cable according to claim 15, wherein the PVA of formula I comprises:
75% to 95% by weight of vinyl acetal groups (a);
6% to 30% by weight of vinyl alcohol groups (b); and
0 to 13% by weight of vinyl acetate groups (c).

* * * * *